(12) United States Patent
van der Lely et al.

(10) Patent No.: US 6,981,467 B2
(45) Date of Patent: Jan. 3, 2006

(54) CONSTRUCTION FOR AUTOMATICALLY MILKING ANIMALS

(75) Inventors: Alexander van der Lely, Rotterdam (NL); Karel van den Berg, Bleskensgraaf (NL); Renatus Ignatius Josephus Fransen, Vlaardingen (NL)

(73) Assignee: Lely Enterprises A.G., Zug (CH)

( * ) Notice: Subject to any disclaimer, the term of this patent is extended or adjusted under 35 U.S.C. 154(b) by 0 days.

(21) Appl. No.: 09/953,147

(22) Filed: Sep. 17, 2001

(65) Prior Publication Data

US 2002/0033139 A1 Mar. 21, 2002

(30) Foreign Application Priority Data

Sep. 15, 2000 (NL) .............................................. 1016195

(51) Int. Cl.
*A01J 5/003* (2006.01)
*A01J 5/00* (2006.01)

(52) U.S. Cl. .................................. 119/14.11; 119/14.02
(58) Field of Classification Search .............. 119/14.02, 119/14.11; 700/247, 259; 901/1; 56/10.1, 56/16.7

See application file for complete search history.

(56) References Cited

U.S. PATENT DOCUMENTS

| 3,732,673 | A | * | 5/1973 | Winn, Jr. ..................... 56/249 |
| 4,034,711 | A | * | 7/1977 | Bender et al. ........... 119/14.11 |
| 4,047,500 | A | * | 9/1977 | Bender et al. ........... 119/14.11 |
| 4,919,224 | A | * | 4/1990 | Shyu et al. .................. 180/168 |
| 6,041,736 | A | * | 3/2000 | van den Berg et al. ... 119/14.02 |
| 6,278,917 | B1 | * | 8/2001 | Bauer et al. ................... 701/23 |
| 6,439,162 | B1 | * | 8/2002 | van den Berg ............. 119/174 |

FOREIGN PATENT DOCUMENTS

| EP | 94202042.1 | 1/1995 |
| EP | 99202503.1 | 10/1999 |
| FR | 75 02732 | 8/1976 |

* cited by examiner

Primary Examiner—Michael J. Carone
Assistant Examiner—Bret Hayes
(74) Attorney, Agent, or Firm—Penrose Lucas Albright

(57) ABSTRACT

A vehicle for automatically milking dairy farm animals which carries a milk reservoir having milk lines which connect to a set of teat cups that are automatically connected to animals' teats by a milking robot. The vehicle is supported from the underlying surface by wheels, caterpillar tracks, or an air cushion, and includes navigational equipment which controls the vehicle so that it positions itself under the animals' teats whereupon the teat cups automatically placed on the relevant animals' teats one by one or in pairs. The vehicle also has its own propulsion power source. The vehicle including all its components is movable and displaceable as a whole. A gripping mechanism for connecting the vehicle to an animal may be included. In a variation, a central station carries a milk reservoir and a plurality of satellite milking units as described above seek out and milk the dairy farm animals. Such units are coupled to the central station by conduits otherwise to deliver milk they receive from the animals to the reservoir carried by the central station.

38 Claims, 4 Drawing Sheets

CONSTRUCTION FOR AUTOMATICALLY MILKING ANIMALS

FIELD OF INVENTION

The invention relates to an apparatus for automatically milking animals, wherein the teat cups, the robot mechanism for connecting the teat cups to the teats of the animal being milked, and a reservoir for receiving milk from the teat cups are displaceable as a whole.

BACKGROUND OF THE INVENTION

Such a construction is known. The known constructions are positioned, for example by means of a tractor, at a certain place, where they are put into operation.

SUMMARY OF THE INVENTION

The invention aims at improving such a construction. According to the invention this is achieved by providing the apparatus with its own propulsion means. By doing so a wide range of application possibilities and a high degree of flexibility in use are attained.

BRIEF DESCRIPTION OF THE INVENTION

The invention will now be explained in further detail with reference to the accompanying figures.

BRIEF DESCRIPTION OF THE PREFERRED EMBODIMENTS

Figure 1:
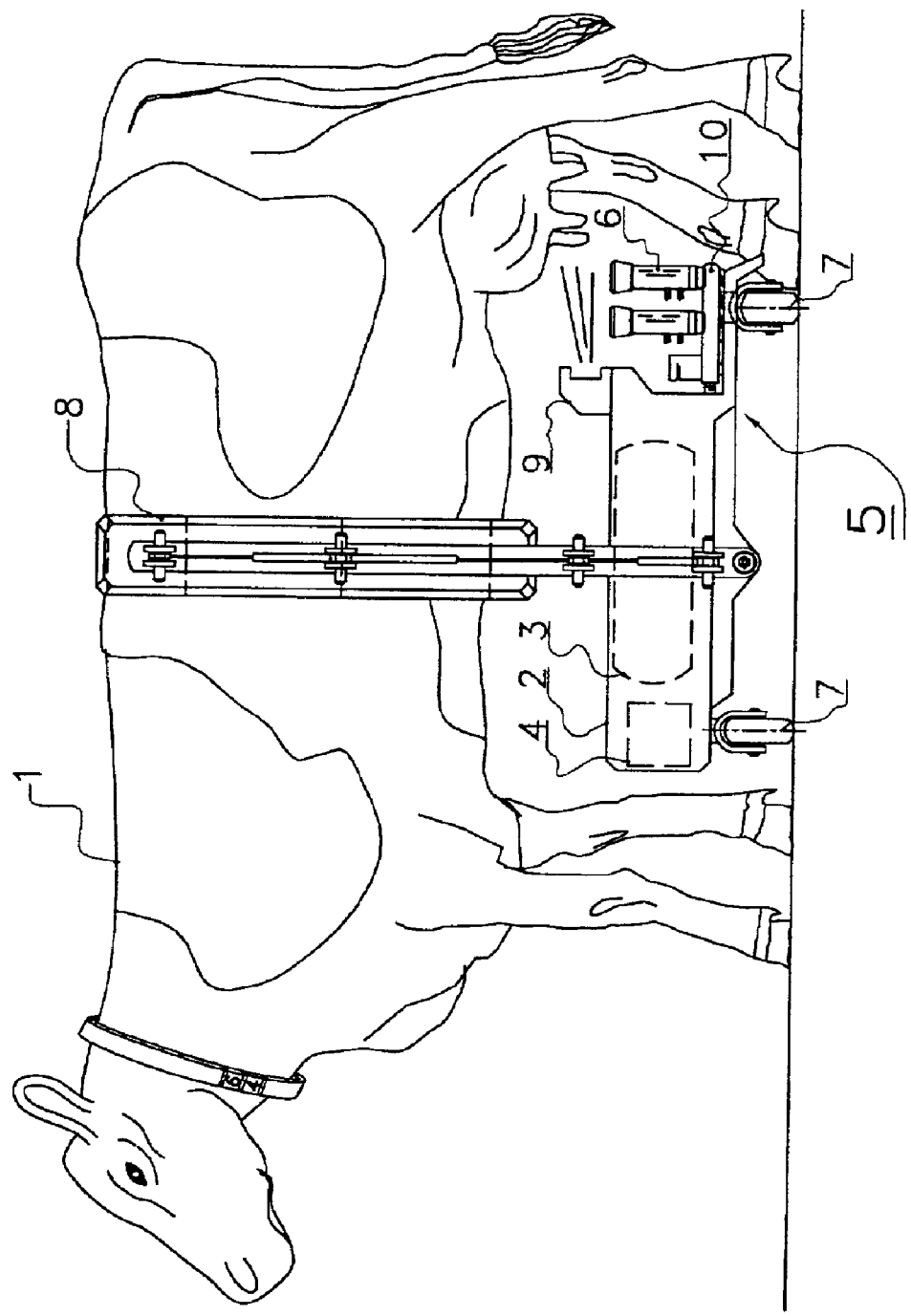
FIG. 1 is a schematic side elevational view of a cow which illustrates a first embodiment of the apparatus according to the invention.

FIG. 1 is a schematic side view of a cow 1 with a first embodiment of apparatus according to the invention. In this embodiment the apparatus for automatically milking animals is an unmanned vehicle 2 with a milk reservoir 3, a water tank 4, milk lines and a milking robot of a construction well known in the art. Four teat cups 6 are provided with means for connecting teat cups 6 to the teats of animal 1 to be milked and with control equipment suitable therefor. The apparatus may further be provided with animal identification means of any type well known in the art, suitable for example for co-operating with identification means on animal 1 which is usually integrated in a collar of animal 1.

Vehicle 2 is provided with its own propulsion means comprising drive means such as a motor and steering means such as swivelling wheels 7. Of course, the apparatus may also be provided with one swivelling wheel or a plurality of non-swivelling wheels or both, or be provided with rollers or caterpillar tracks or an air cushion construction or any combination of the foregoing. With the aid of the drive means and the steering means the apparatus is suitable for moving across the ground in a rolling or a hovering manner.

Preferably the propulsion means includes navigation means which is suitable foe determining a course to be followed by the mobile apparatus for causing the apparatus to follow the course so determined with the aid of the propulsion means. The navigation means may comprise a remote computer having an input member and a map of the neighborhood as well as GPS or DGPS. In this manner unmanned vehicle 2 may be accurately controlled.

In a preferred embodiment, the apparatus is provided with means for locating a selected animal (said means being suitable for co-operating with positioning means provided near, or in the animal, such as known transmitting and receiving equipment or GPS or DCPS), and is suitable for approaching and tracking the selected animal on the basis of data from the locating means. With knowledge as to the current position of vehicle 2 and the current position of a selected animal 1 to be milked, a computer can determine a course to be followed and control the propulsion means in such a manner that vehicle 2 follows th determined course. In this manner the animal 1 to be milked can automatically be found and approached by vehicle 2.

Figure 2:
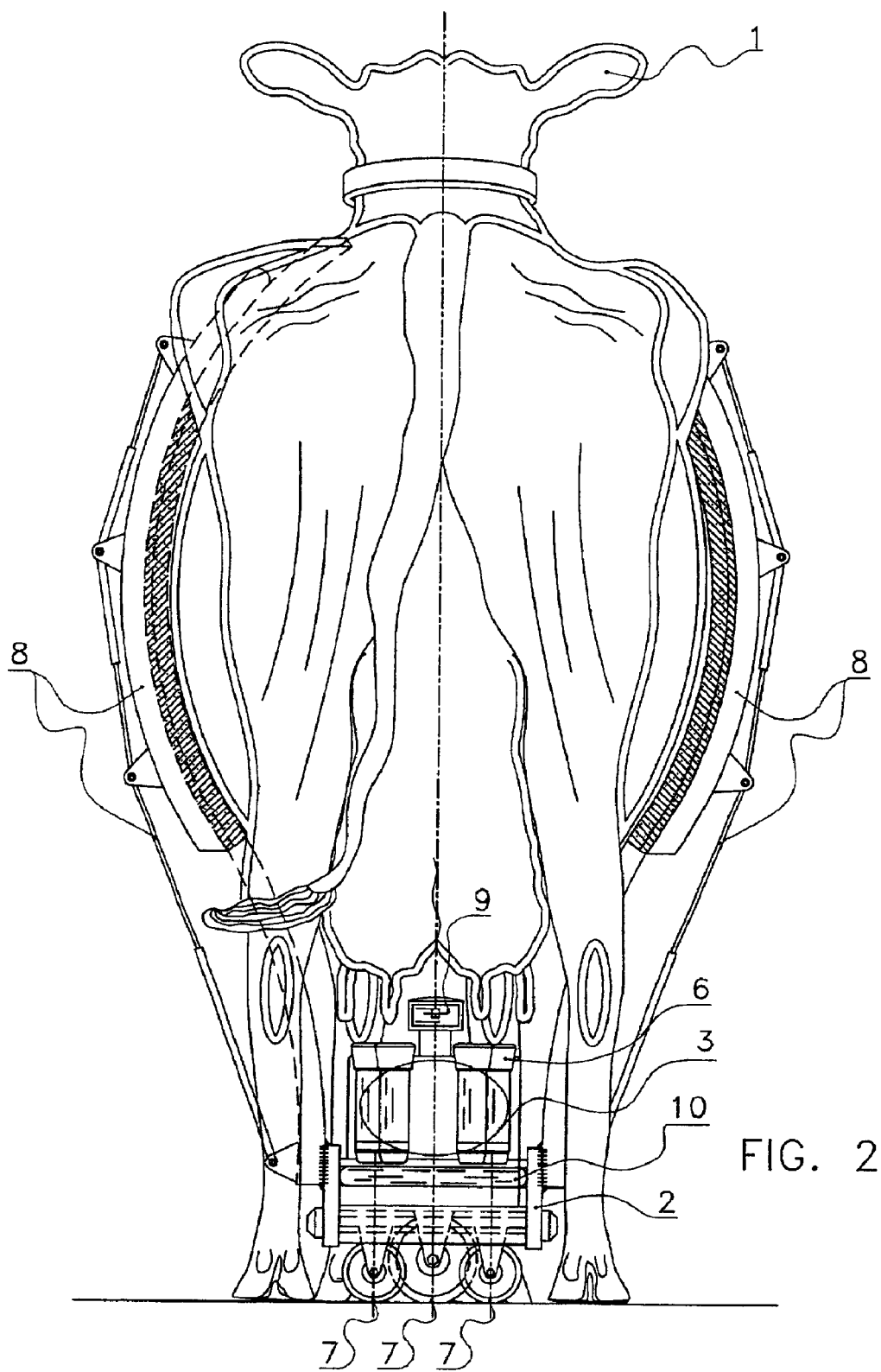
FIG. 2 is a schematic rear elevational view of the cow with the apparatus shown in FIG. 1.

The apparatus is provided with means being coupling at least in part to animal 1 to be milked. Said coupling means may comprise a pair of gripping arms 8, capable of being folded and unfolded or being slid in and out in a telescoping manner, which are able to grip cow 1 on either side of her trunk when vehicle 2 has reached a position under cow 1 (see also FIG. 2). In another embodiment the gripping arm 8 may be suitable for gripping at least one leg of animal 1. The apparatus is suitable for remaining connected to animal 1 for a time interval after coupling, which time interval may be adjustable. The time interval may depend on the duration of the milking process or the duration of the connection of the teat cups 6, or both. The apparatus further provides for activating the means for connecting teat cups 6 after coupling. Cow 1 can then be milked automatically. After milking, teat cups 6 are disconnected and gripping arms 8 are folded or slid aside. The apparatus can then continue to the next animal to be milked.

The means for connecting the teat cups 6 comprises for example a laser scanner 9 and a lifting device 10 for the teat cups 6 or a rotatable or shiftable or pivotable platform for the teat cups 6 or any combination of the foregoing may be employed as lifting the device 10. Lifting device 10 may be suitable for connecting teat cups 6 one by one or in pairs.

The apparatus is preferably provided with sensor means for registering movements or displacements or both of animal 1 to be milked. It is, for example, possible for the apparatus to track animal 1 to be milked before or during milking with the aid of data from the sensor means. When the apparatus as a whole is not too heavy, means 8 for coupling may also be designed in such a manner that the apparatus is suspended as a whole from animal 1 to be milked.

The apparatus may be provided with attraction means for an animal 1 to be milked, with means for enticing an animal 1 to be milked (such as alurement with the aid of a transmitter and a receiver), or with rejecting or rebuffing means for keeping animals that are not to be milked for the time being at a distance. Also the apparatus may include transmitting or receiving means, or both, for transmitting or receiving data to or from a receiving station or both or collecting data such as relate to all milkings. The apparatus may further be provided with transmitting and receiving means, or both, for transmitting or receiving data, or both, to or from, or both, an animal 1 to be milked. The latter means may be used for example for positioning purposes or for attracting an animal 1 to be milked.

Figure 3:
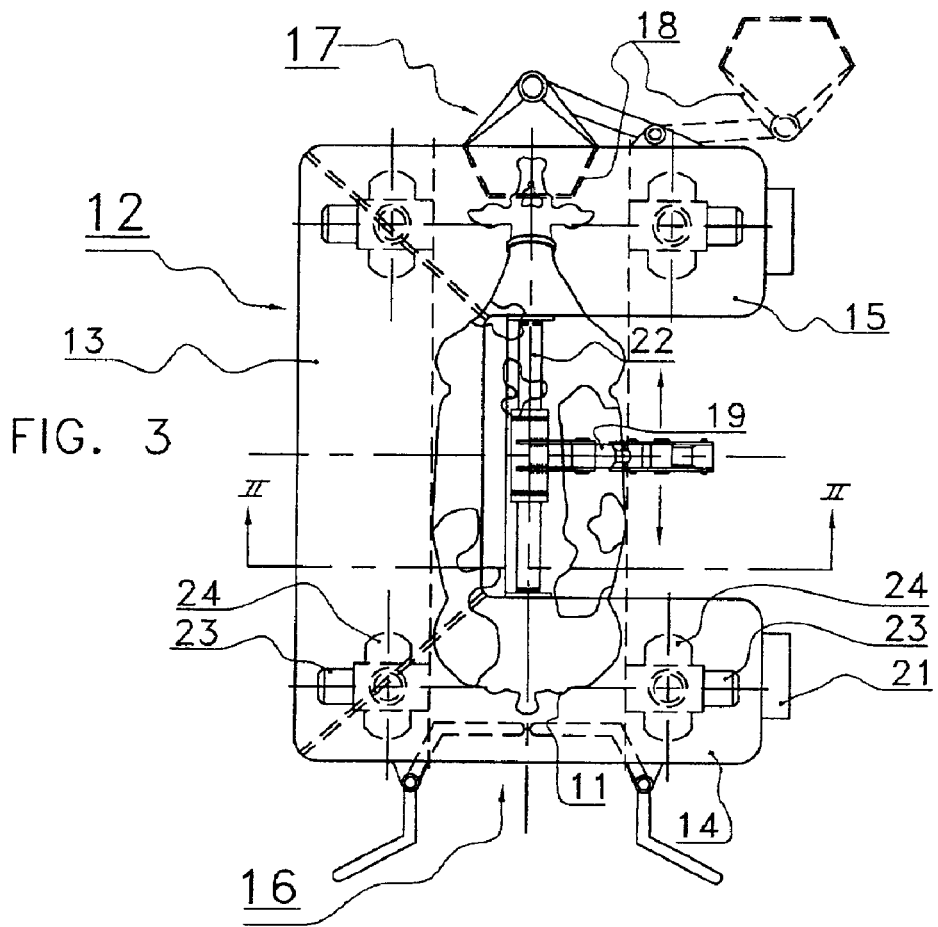
FIG. 3 is a schematic plan view of a further embodiment of the apparatus according to the invention.
Figure 4:
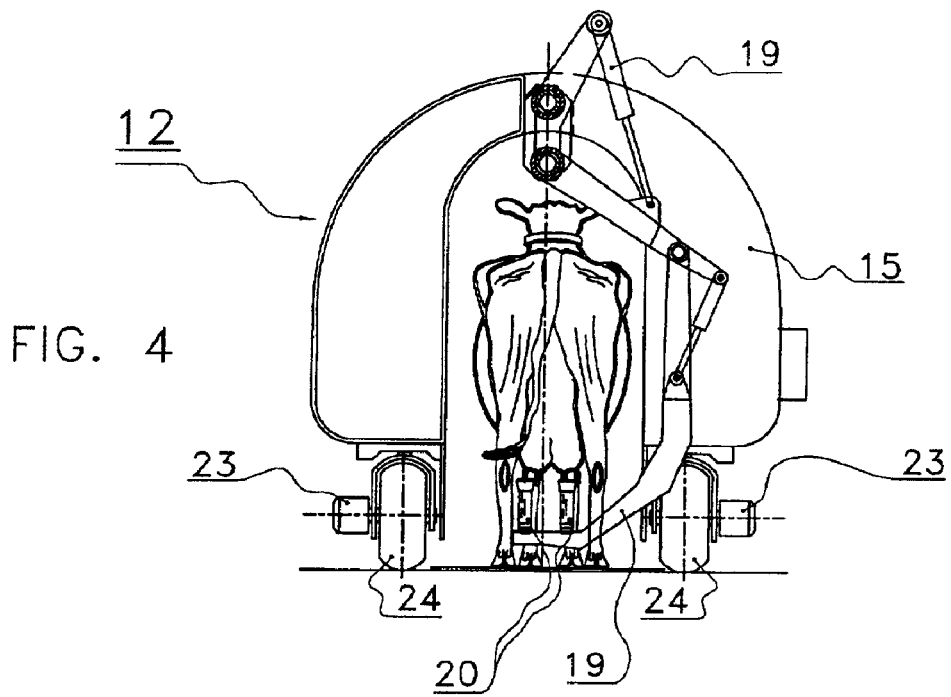
FIG. 4 is a schematic cross-section of the apparatus taken on lines II-II in FIG. 3.

FIG. 3 is a schematic plan view of a further embodiment of the apparatus according to the invention. By way of illustration FIG. 4 shows schematically a cross-section of the apparatus taken on the section line defined by arrow II-II in FIG. 3. In this embodiment the apparatus for automatically milking an animal 11 is unmanned vehicle 12 which carries a milk tank 13, a tank 14 for water and disinfectant, a tank 15 for water and foremilk, an entrance 16, an exit 17 and a feeding trough 18 that is capable of being pivoted aside and serves as a means for attracting the animal to be milked to the apparatus and as a positioning means. Tanks 14 and 15 are arc-shaped which allow the cow 11 to pass thereunder.

The apparatus is further provided with a milking robot with a controllable robot arm 19 and four teat cups 20, with means for connecting teat cups 20 to the teats of the animal 11 to be milked and with control equipment suitable therefor, such as a computer 21. Robot arm 19 may be moved for example along a rail 22 disposed in the upper part of vehicle 12. The apparatus may further again be provided with animal identification means which are well known in the art and which are suitable for co-operating with identification means integrated in a collar of an animal 11 to be milked.

Vehicle 12 is provided with its own propulsion means comprising drive means such as one or more motors 23 and steering means for wheels 24. Further navigation means or means for locating animals to be milked, or both, may be provided. The vehicle 12 may automatically be parked in the vicinity of a number of cows to be milked. These animals can then enter the apparatus to be milked. Vehicle 12 may also approach a selected animal and possibly follow it until said animal is prepared to be milked. For that purpose vehicle 12 can then assume the position shown in FIGS. 3 and 4.

Figure 5:
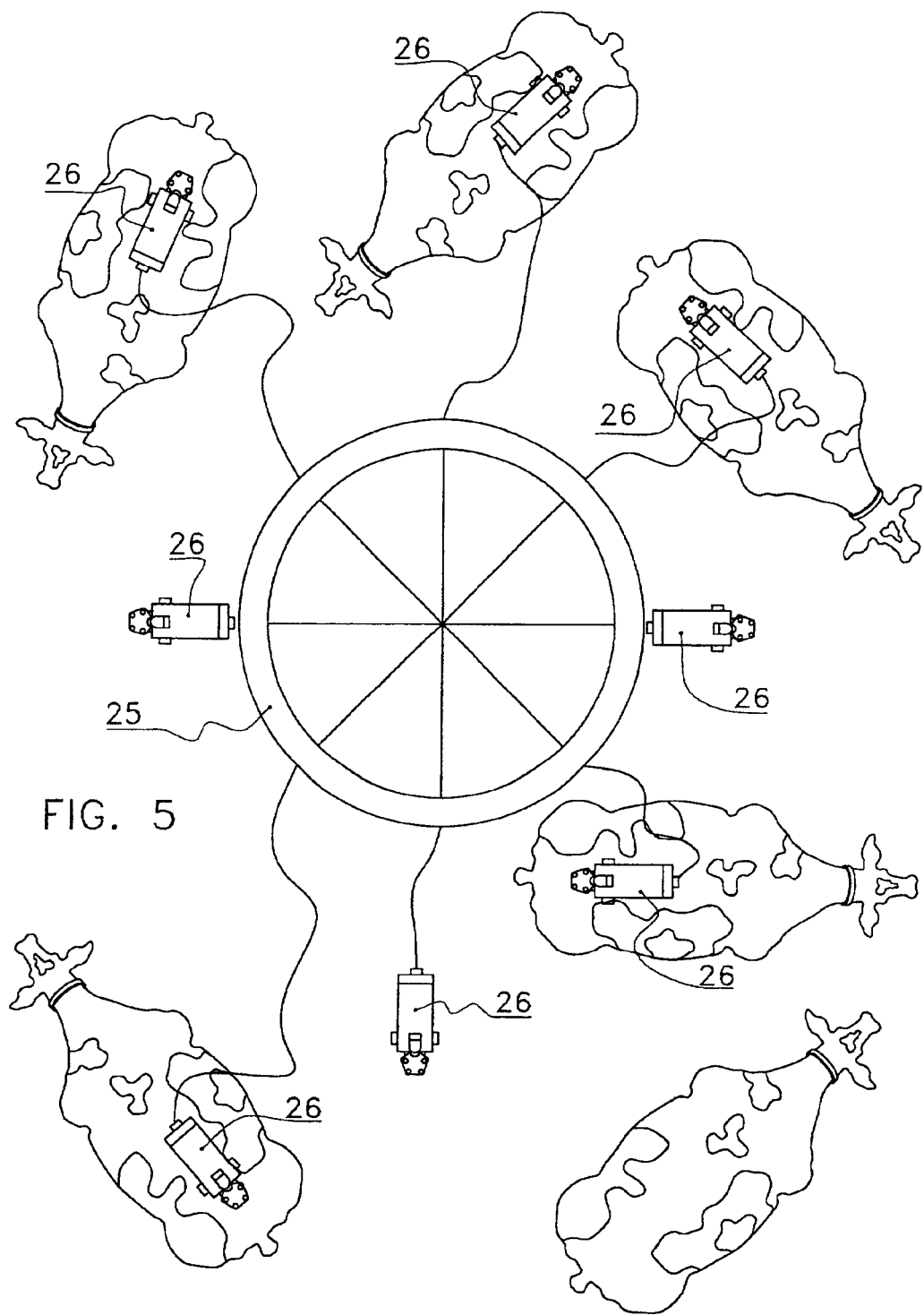
FIG. 5 is a schematic plan view of a further embodiment of an apparatus in accordance with the invention.

FIG. 5 shows schematically a plan view of a further embodiment of the apparatus. In this embodiment the apparatus comprises a movable structure 25 and a plurality of milking units 26 that are movable relative to structure 25. Structure 25 is an automatically movable master station with appropriate control equipment and a milk reservoir. Further navigation means or means for locating animals to be milked, or both may be provided. Structure 25 has its own propulsion means and can automatically be positioned in the vicinity of a group of animals to be milked.

Milking units 26 are automatically movable satellite stations and comprise coupling means as well as teat cups and the means for connecting the teat cups to an animal to be milked. Units 26 may be connected to structure 25 via milk lines. They have their own propulsion means and may each be provided with navigation means or means for locating animals to be milked, or both. Therefore, units 26 can locate, approach and possible track animals to be milked in the vicinity of the master station 25. When the units 26 are appropriately positioned relative to the animal to be milked, the animal can be milked automatically.

Each Unit 26 is preferably provided with sensor means for registering movements or displacements, or both, of the animals to be milked. For example, unit 26 can track the animal to be milked before or during milking with the aid of data from sensor means. Units 26 may be provided with or without means for gripping the animal to be milked. Units 26 may also operate without direct connection to structure 25. In that case they delivery regularly or when required milk which they have received from the milkings at the master station 25.

Although we have disclosed the preferred embodiments of our invention, it is to be understood that it is capable of adaptations and modifications within the scope of the following claims.

Having thus disclosed our invention, what we claim as new and to be secured by Letters Patent of the United States of America is:

1. An unmanned vehicle for automatically milking animals that are not in a stall or milking compartment, the vehicle comprising a teat cup, robotic means for connecting said teat cup to a teat of an animal to be milked, a milk reservoir for receiving and storing milk from said animal being milked, conduit means for connecting said teat cup to said milk reservoir, detecting means for continually detecting a location of said animal to be milked, and propulsion means for moving the vehicle into a position at said location to milk said animal, said robotic means, said teat cup, said milk reservoir, said conduit means and said propulsion means being included in the vehicle.

2. The vehicle in accordance with claim 1, wherein said propulsion means comprises drive means.

3. The vehicle in accordance with claim 1, wherein said propulsion means comprises steering means.

4. The vehicle in accordance with claim 1, wherein said propulsion means comprises navigation means for continually determining a course to be followed by the vehicle.

5. The vehicle in accordance with claim 3, which comprises navigation means that controls said steering means.

6. The vehicle in accordance with claim 1, comprising an animal identification means for identifying an animal that is next to be milked which is operatively associated with said detecting means.

7. The vehicle in accordance with claim 6, wherein said identification means is, at least in part, carried by said animal to be milked that is being located by said detecting means.

8. The vehicle in accordance with claim 7, wherein said identification means which is carried at least in part by the animal being located provides data which indicates the location of such animal.

9. The vehicle in accordance with claim 1, comprising coupling means for coupling the vehicle to said animal, said coupling means not comprising said teat cup.

10. The vehicle in accordance with claim 9, wherein said coupling means comprises a gripping arm.

11. The vehicle in accordance with claim 10, wherein said gripping arm comprises body gripping means to grip the body of said animal being milked.

12. The vehicle in accordance with claim 10, wherein said gripping arm comprises gripping means to grip a leg of said animal being milked.

13. The vehicle in accordance with claim 10, wherein said gripping arm comprises retaining means to remain connected to said animal during a time interval after gripping such animal.

14. The vehicle in accordance with claim 13, comprising adjusting means for adjusting said time interval.

15. The vehicle in accordance with claim 13, wherein said time interval is dependent on the time required for milking such animal.

16. The vehicle in accordance with claim 13, wherein said time interval is dependent upon a period of time said teat cup is connected to the teat of the animal being milked.

17. The vehicle in accordance with claim 10, comprising activating means for gripping said animal being milked by said gripping arm after said teat cup has been placed on the teat of said animal being milked.

18. The vehicle in accordance with claim 1, wherein said propulsion means comprises wheels.

19. The vehicle in accordance with claim 1, wherein said propulsion means comprises ground engaging rolling means.

20. The vehicle in accordance with claim 1, wherein said propulsion means comprises endless tracks.

21. The vehicle in accordance with claim 1, which comprises steering means for steering the vehicle and an air cushion construction for supporting the vehicle above an underlying surface on an air cushion produced by said air cushion construction.

22. The vehicle in accordance with claim 1, wherein said propulsion means comprises a motor.

23. The vehicle in accordance with claim 1, which comprises animal attraction means for attracting said animal to the vehicle to be milked.

24. The vehicle in accordance with claim 1, which comprises summoning means for summoning said animal to the vehicle to be milked.

25. The vehicle in accordance with claim 1, which comprises repelling means for keeping animals that are not to be milked for the time being at a distance from said vehicle.

26. The vehicle in accordance with claim 1, in combination with a receiving and transmitting station wherein the vehicle comprises transmitting and receiving means for transmitting and receiving data to and from said receiving and transmitting station.

27. The vehicle in accordance with claim 1, which comprises transmitting and receiving means and wherein said animal to be milked carries a further transmitting and receiving means, said transmitting and receiving means of said vehicle and said further transmitting and receiving means comprising means for interchanging data.

28. A combination of an unmanned first vehicle which comprises a milk reservoir for receiving and storing milk taken from an animal being automatically milked and propulsion means for moving the vehicle to a desired location, with an unmanned second vehicle which comprises a teat cup, robotic means for automatically connecting said teat cup to said animal to be milked, and propulsion means for moving the vehicle into a position near said location to milk said animal automatically, said robotic means, said teat cup, and said propulsion means being carried and displaceable as a whole by said second vehicle, and coupling means between said first vehicle and said second vehicle for conveying milk from said second vehicle to said milk reservoir of said first vehicle.

29. The combination in accordance with claim 28, wherein said coupling means comprises a milk conduit which connects said second vehicle to said first vehicle.

30. The combination in accordance with claim 28, wherein said coupling means connects said teat cup of said second vehicle to said milk reservoir of said first vehicle.

31. The combination in accordance with claim 28, which comprises sensor means for registering movements of said animal to be milked by said second vehicle.

32. The combination in accordance with claim 31, which comprises control means for said first and said second vehicles for controlling the movement of each of said vehicles based on data received by said sensor means.

33. The combination in accordance with claim 28, wherein said second vehicle comprises a tracking means which provides data for tracking said animal to be milked by said second vehicle.

34. The vehicle in accordance with claim 1, which comprises a coupling and suspending means for respectively coupling and suspending the vehicle as a whole to and from said animal being milked.

35. An unmanned vehicle for automatically milking animals which comprises a teat cup, robotic means for connecting said teat cup to an animal to be milked, detecting means for continually detecting where said animal to be milked is located, propulsion means for moving the vehicle into a position where said animal is located to milk said animal, and coupling means for coupling the vehicle to said animal being milked at a location where it is being milked, said teat cup, said propulsion means and said coupling means being included the vehicle.

36. A combination of an unmanned movable central station and a plurality of unmanned satellite units, each of said satellite units comprising a teat cup, robotic means for automatically connecting each said teat cup to a corresponding teat of each said animal being milked, detecting means for continually detecting a location of each of said animals to be milked, propulsion means for moving one of said satellite units into a position at said location to milk each of said animals, and coupling means to convey milk received by each of said satellite units to a milk reservoir in said central station, said teat cup, robotic means and propulsion means for each said satellite unit being displaceable as a whole relative to said central station and said animal being milked.

37. A method for automatically milking a dairy farm animal that is not confined in a stall or a milking compartment which comprises mounting a teat cup and robotic means for connecting said teat cup to the animal to be milked on a surface supported vehicle, continually sensing a location of said animal to be milked, automatically moving said vehicle to said location, automatically connecting said teat cup to the teat of the animal being milked at said location, automatically connecting said vehicle to said animal by gripping means, milking said animal at said location with said teat cup, and disconnecting said teat cup from said teat and said gripping means from said animal upon completion of the milking.

38. A method of automatically milking dairy farm animals that are not confined to a stall or a milking compartment which comprises: moving a central station into an area wherein said animals are located; moving into the vicinity of said central station a plurality of unmanned satellite units, each said satellite units comprising means for automatically milking each of said animals; automatically determining the location of each said animal in said area to be milked; automatically moving one of said satellite units into a position at the location of one of said animals to be milked for milking said one animal; milking said one animal by said one of said satellite units, and conveying milk received by said one of said satellite units to said central station.

* * * * *